United States Patent Office 3,519,698
Patented July 7, 1970

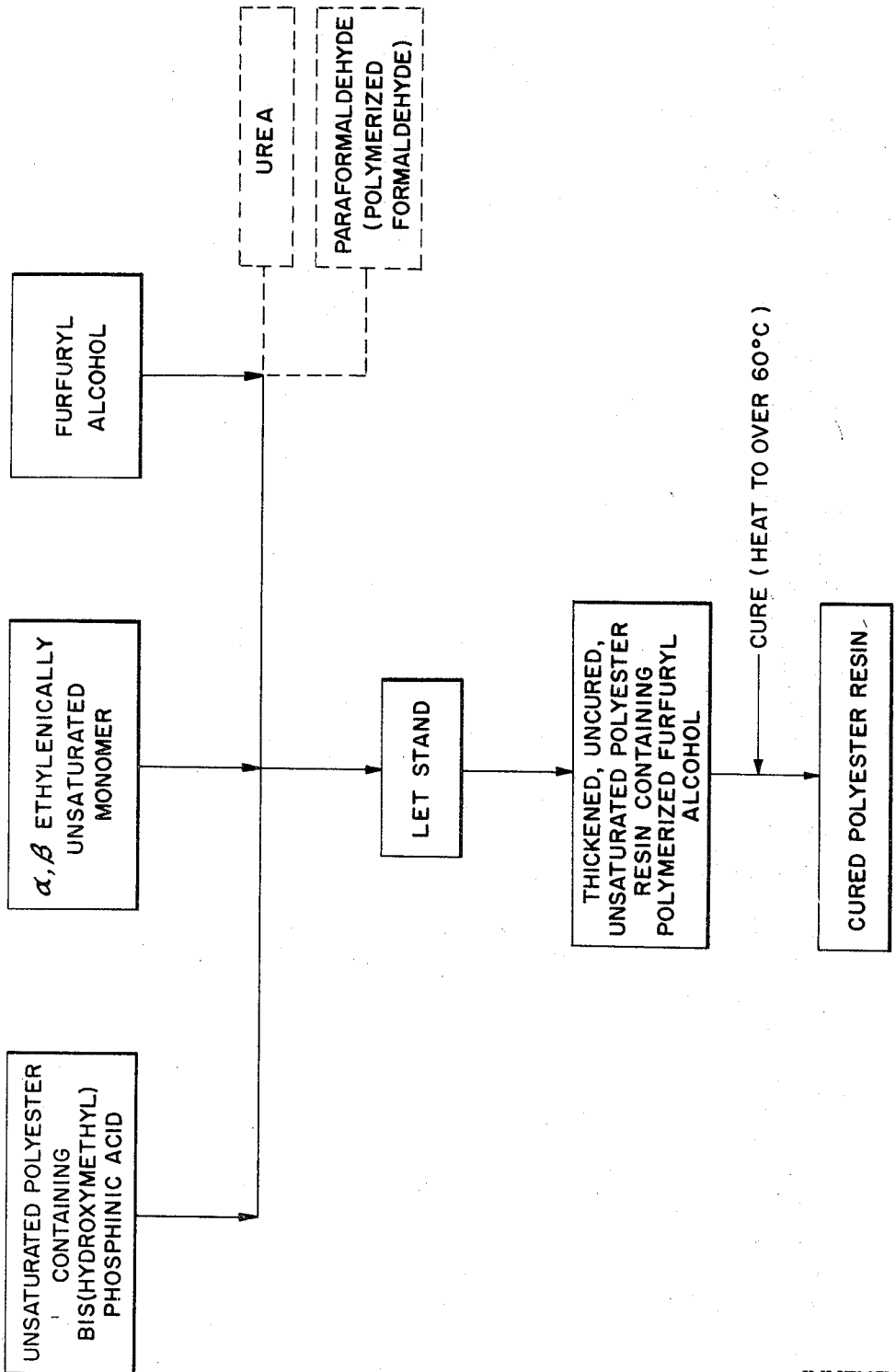

3,519,698
THICKENABLE UNSATURATED POLYESTER RESIN SYSTEM
Melvin E. Baum, Monroeville, Pa., assignor to Koppers Company, Inc., a corporation of Delaware
Filed Nov. 1, 1967, Ser. No. 679,735
Int. Cl. C08g 39/06
U.S. Cl. 260—850                    2 Claims

ABSTRACT OF THE DISCLOSURE

An unsaturated polyester resin system capable of being chemically thickened comprises: (1) an unsaturated polyester which has been modified by the substitution of bis(hydroxymethyl) phosphinic acid for at least a portion of the dihydric alcohol in the polyester; (2) an ethylenically unsaturated monomer; and (3) furfuryl alcohol. The system is chemically thickened by: (a) the polymerization of the furfuryl alcohol which is catalyzed by the phosphinic acid; and (b) the apparent bonding of the furfuryl alcohol polymer chains to the polyester through the phosphinic acid groups. Small amounts of either formaldehyde or urea or both can also be used to copolymerize with the furfuryl alcohol.

BACKGROUND OF THE INVENTION

Cured unsaturated polyester resins which have been reinforced by fibrous material such as glass fiber mats or the like have excellent physical strength characteristics. However, the formation of shaped objects with such materials has presented problems because the fibers initially immersed within the uncured liquid resin tend to rise to the surface causing the object, after curing of the resin, to have irregularities in the surface.

To avoid this problem, preforms have been made by spraying glass fibers onto screens similar in shape to the final desired product. Air is sucked through the screen to hold the fibers in place. A binder is then sprayed over the fibers, and cured to hold the fibers together in the desired form. The form is then placed into a mold and the unsaturated polyester resin is poured into the mold and cured therein. The resin must be viscous enough to adhere to the form, yet not so viscous as to prevent proper wetting of the fibers.

To overcome the foregoing cumbersome and critical process, it has been proposed to coat the glass fibers with the uncured unsaturated polyester resin liquid to thoroughly wet the fibers. The liquid resin is then thickened, without actually curing the resin, by chemical or physical means. The physical means include: (1) driving off volatile solvent in which a viscous polyester resin has been dissolved; or (2) using a heated viscous polyester resin and then cooling the coated fiber after application. The chemical means include: (1) the addition of a thickening agent as MgO to the polyester resin; or (2) the partial copolymerization or curing of the resin to a gelled or B-stage. Fibrous reinforcements can thus be precoated with a low viscosity thickenable polyester resin which will therefore properly wet the fibers, yet the polyester resin coatings will rapidly lose its tacky state by the increase in viscosity enhancing the storability of the precoated fibers. Thus, the use of preforms is eliminated as well as the attendant mess of coating the irregular-shaped preform with a liquid resin. Glass fiber mats coated with such resins may be easily handled and charged to molding machines. More positive control of the amount of charge as well as the shape of the charge can thus be maintained resulting in higher quality molded products as well as economic savings.

However, such systems each have certain economic drawbacks. The solvent system, of course, results in loss of the solvent, plus disposal of the fumes. Heating viscous polyesters to reduce their viscosity is costly and cumbersome. Chemically thickening the polyester resin such as by the addition of MgO or Mg(OH)$_2$ as shown in U.S. Pat. 2,568,331, issued to Vincent Frilette results in an eventual viscosity buildup; however, one of its drawbacks is that the initial thickening rapidly builds up the viscosity which reduces the pot life of the resin. Another difficulty encountered is the slow overall buildup of viscosity of the resin. On the other hand, resins modified to rapidly cure to a B-stage have a tendency to continue to cure or harden beyond the B-stage within a short period of time since a B-stage actually represents an intermediate stage of the vinyl copolymerization.

SUMMARY OF THE INVENTION

Quite surprisingly, I have discovered a system for chemically thickening polyester resins which comprises the addition of a second polymerizable monomer to an unsaturated polyester resin which second polymerizable monomer is acid catalyzed by an inorganic acid group which is reacted into the polyester itself. The addition of the second monomer serves to further dilute the polyester resin and thus, the initial viscosity of the polyester resin is actually lowered. However, within a short period of time, the viscosity rapidly rises as the second monomer proceeds to polymerize.

In accordance with the invention, a curable unsaturated polyester resin system which increases in viscosity after formation of the system comprises; (a) an unsaturated polyester formed by condensing in approximately equimolar proportions: (1) at least one dicarboxylic acid at least a portion of which contains alpha,beta-ethylenic unsaturation with (2) a dihydric alcohol, at least a portion of which is bis-(hydroxymethyl) phosphinic acid; (b) an alpha,beta-ethylenically unsaturated copolymerizable monomer; and (c) furfuryl alcohol. The phosphinic acid acts as a catalyst for the self-polymerization of the furfuryl alcohol. The polymerized chains of furfuryl alcohol then apparently bond to the phosphinic acid groups within the uncured polyester thus causing an increase in viscosity by lengthening the polyester chains. Small amounts of either formaldehyde or urea or both can also be used to copolymerize with the furfuryl alcohol.

BRIEF DESCRIPTION OF THE DRAWING

The drawing is a flow-sheet which illustrates schematically the steps which are described in detail below.

DETAILED DESCRIPTION

As previously described, in accordance with the invention, an unsaturated polyester resin (wherein at least a portion of the dihydric alcohol in the unsaturated polyester contained in the resin is bis-(hydroxymethyl) phosphinic acid) is thickened by the addition of furfuryl alcohol, the polymerization of which is then catalyzed by the phosphinic acid within the polyester.

The term "unsaturated polyester" as used herein is defined as the condensation polymer produced by condensing approximately equimolar proportions of at least one dicarboxylic acid, at least a portion of which contains alpha,beta-ethylenic unsaturation with at least one dihydric alcohol. The term "unsaturated polyester resin" as used herein is meant to define the combination of (a) the condensation polymer or unsaturated polyester and (b) an ethylenically unsaturated monomer such as styrene which may be copolymerized with the unsaturated polyester. Before copolymerization, the monomer-polyester mixture may be referred to as an uncured polyester resin and after the copolymerization, as a cured polyester resin.

Unsaturated polyester resins are well known in the art.

(See, for example, U.S. Pat. 2,255,313, issued to Carlton Ellis.) The unsaturated polyester portion of the resin is a condensation polymer formed by polyesterifying dicarboxylic acids with dihydric alcohols. To provide unsaturation within the polyester, at least a portion of the dicarboxylic acids must contain alpha,beta-ethylenic unsaturation. Examples of such unsaturated dicarboxylic acids include maleic and fumaric acids, as well as maleic anhydride. The remainder of the dicarboxylic acids are usually either saturated normal aliphatics such as adipic acid, succinic acid or the like, or aromatic diacids such as phthalic acid, isophthalic acid or the like as well as their halogenated derivatives such as tetrachlorophthalic anhydride.

Examples of common dihydric alcohols used in the polyesterification are ethylene glycol, 1,2-propane diol (propylene glycol) and the ether glycols such as diethylene glycol, dipropylene glycol, or the like. The cyclic glycols such as 1,4-cyclohexane diol or the adducts or reaction products of alkylene oxides with bis-phenol A are also well-known constituents of polyesterification products which may be used in the unsaturated polyester resin of the invention.

As previously mentioned, in accordance with the invention, at least a portion of the conventional dihydric alcohol in the polyester is replaced with bis-(hydroxymethyl) phosphonic acid. The total amount of the dihydric alcohols and dicarboxylic acids, is, therefore, not changed and is still approximately stoichiometric. This is necessary to obtain a high molecular weight long chain polyester. The phosphinic acid group then acts as a catalyst to polymerize furfuryl alcohol which is added to the polyester resin. The amount of bis-(hydroxymethyl) phosphinic acid used may range from 5–25 mole percent of the total moles of acids and alcohols used in forming the polyester.

After formation, unsaturated polyesters are conventionally dissolved in a copolymerizable ethylenically unsaturated monomer such as styrene or vinyl toluene. The amount of monomer used generally is about 10–60% by weight of the total polyester resin. Illustrative of such copolymerizable ethylenically unsaturated monomers are styrene, alphamethyl styrene, chlorostyrene, vinyl toluene, divinyl benzene, and the like. The unsaturated polyester resin is subsequently cured by copolymerization of the unsaturated polyester and the unsaturated monomer. This copolymerization is usually initiated by a free radical generating catalyst such as, for example, peroxide catalyst, although other free-radical generating means such as, for example, UV light or radiation can also be used.

The additional monomer, furfuryl alcohol, which, in accordance with the invention, is added to the polyester resin, is not an ethylenically unsaturated monomer which copolymerizes with the unsaturated polyester as do the conventional monomers listed above. Rather, the furfuryl alcohol condenses with itself or with formaldehyde and urea in the presence of an acid catalyst. Thus, the condensation of furfuryl alcohol occurs in the presence of an acid catalyst such as the bis-(hydroxymethyl) phosphinic acid compound used in the polyester of the present invention. However, by a mechanism which is not entirely understood, apparently the furfuryl alcohol polymerization in the polyester resin system of the invention, is not the only acid catalyzed by the phosphinic acid in the polyester, but apparently a subsequent coupling reaction between the polymerized chains of furfuryl alcohol and the phosphonic acid groups in the polyester also occurs. For example, when a conventional polyester resin (conventional unsaturated polyester and monomer) (which has not been modified by the condensation of bis-(hydroxymethyl) phosphinic acid into the condensation polymer itself) is mixed with furfuryl alcohol and bis-(hydroxymethyl) phosphinic acid is merely added as a non-chemically bonded additive, the viscosity increases very slightly over a period of several days indicating the phosphinic acid may be catalyzing the polymerization of the furfuryl alcohol. However, since the phosphinic acid is not chemically combined with the polyester, no coupling of the polymerized chains of furfuryl alcohol with the unsaturated polyester chain occurs. Therefore, only a slight increase in viscosity is noted in such a system as would be expected if polymerized furfuryl alcohol were simply added to the system. However, when the bis-(hydroxymethyl) phosphinic acid is acutally chemically bonded into the unsaturated polyester, the system actually solidifies in about 11 hours after the furfuryl alcohol is added. This supports the hypothesis that the furfuryl alcohol chains chemically bonded to the polyester chains through the phospinic acid groups.

In the practice of the invention, the furfuryl alcohol is added to the polyester resin system by the user just prior to use. The polyester resin system containing the the furfuryl alcohol then solidifies at room temperature deu to the polymerization of the furfuryl alcohol catalyzed by the phosphinic acid groups and the subsequent bonding of the furfuryl polymers to the polyester. The final cure, however, of the resin does not occur until the initiation of the vinyl copolymerization between the unsaturated portions of the polyester and the ethylenically unsaturated monomer such as styrene. Thus, the resin system can be used to coat glass fiber mats and will quickly set up to a solid workable, yet flexible state. If a high temperature free radical generating catalyst is included in the system the polyester resin-impregnated mat can then be charged to a mold and subsequently molded at higher temperature to a shaped object and cured at this temperature to form the final cured product.

The condensation polymer or unsaturated polyester to monomer weight ratios in an unsaturated polyester resin may vary from 90% polymer-10% monomer to as high as 40% polymer-60% monomer. Because the furfuryl alcohol does not contain unsaturated bonds suitable for vinyl copolymerization the system must always contain an ethylenically unsaturated monomer such as styrene. However, the physical properties of a polyester resin are normally dependent upon the amount and type of polyester or condensation polymer present and for any given condensation polymer, the physical properties can be reduced by the presence of excessive amounts of monomer. Therefore, about 50% monomer is normally considered to be the maximum amount; although, in certain instances, depending upon the particular polyester, monomer amounts as high as 60% can be used. Because of these limitations, the presence of an additional furfuryl alcohol monomer requires a reduction of the amount of ethylenically unsaturated monomer useable in the system. It has been found that excellent results are achieved, for example, if the total monomer content is from 10–60% and preferably 30–50% of the total weight of the polyester resin. About 10–25% by weight furfuryl alcohol is the desired and preferred range of this material to be used in the system. Regardless of the amount of furfuryl alcohol used within this range, at least 10–20% by weight of ethylenically unsaturated monomer must also be used to insure sufficient vinyl copolymerization in the subsequent step.

The furfuryl alcohol can also be used with formaldehyde or urea or both to form copolymers rather than homopolymers. This is particularly advantageous when the total monomer content is very high (50% or higher) because the copolymers formed cause a higher degree of thickening at these high monomer levels than does the furfuryl alcohol alone. When these additional ingredients are used, they can replace up to about 15% of the furfuryl alcohol. The formaldehyde is preferably used in its anhydrous polymerized form $(CH_2O)_n$ when $n$ is about 6–100.

As mentioned previously, unsaturated polyester resins are cured by the vinyl copolymerization of the unsaturated polyester resins and the unsaturated monomer across the ethylenic double bonds contained in each. Initiation of this copolymerization is usually effected by use of a free radical generating catalyst such as, for example, a peroxide catalyst, although UV light, radiation or the like are also less frequently used. The polyester resin system of this invention is also subsequently cured by vinyl copolymerization of the unsaturated polyester and unsaturated monomer. However, because of the chemical thickening mechanism used in the system of the invention, and its utility in thickening polyester resins without the initiation of the vinyl copolymerization, the preferred practice in initiating the subsequent vinyl copolymerization is to either utilize a high temperature catalyst or to omit the catalyst entirely and rely on external free radical initiating means such as UV light, radiation or the like. In this way, the unsaturated polyester resin system is chemically thickened via the polymerization of the furfuryl alcohol, yet the system has very long shelf life because the vinyl copolymerization or curing is not commenced until the input of the additional light or heat energy or the like.

Examples of high temperature catalysts which can be used to initiate the copolymerization include benzoyl peroxide; cumene hydroperoxide, di-t-butyl peroxide; t-butyl perbenzoate; dicumyl peroxide; 2,5-dimethylhexane-2,5-dihydroperoxide; and the like. Other high temperature free radical generating catalysts which can also be used include, for example, 2,2'-azobisisobutyronitrile.

It should be noted that the initial chemical thickening which occurs in the invention is not a gelation or B-stage of the resin. Such gelation or B-stage is by definition indicative of the vinyl copolymerization between the unsaturated portion of the condensation polymer or unsaturated polyester and the ethylenically unsaturated monomer. The chemically thickened resin system of the invention remains, for example, completely soluble in acetone until the subsequent cure of the polyester is initiated by the peroxide catalyst or other free radical generating means. Gelled or B-stage polyester resins, in contrast, are not entirely soluble in acetone, which insolubility is indicative of the presence of vinyl copolymerization.

EXAMPLE I

An unsaturated polyester was prepared by condensing 1 mole of maleic anhydride with 0.9 mole of propylene glycol and 0.1 mole of bis(hydroxymethyl) phosphinic acid in a reactor maintained at 205° C. for 8 hours under an inert blank of nitrogen. 70 parts of the resultant polyester was diluted with 30 parts of styrene, 25 parts of furfuryl alcohol and 1% benzoyl peroxide. The resultant polyester resin had a viscosity of 2100 cp. The resin solidified at 11 hours. The resin was cured at 135° C. for 1 hour to yield a tough, hard product.

EXAMPLE II

A polyester resin was prepared in accordance with Example I and diluted with styrene to a 60 part polyester-40 part styrene resin. This resin was then further diluted with 25 parts of respectively: (a) furfuryl alcohol; (b) furfuryl alcohol and paraformaldehyde; (c) furfuryl alcohol, paraformaldehyde, and urea; and (d) furfuryl alcohol and urea. The amounts of each additive and the viscosities measured are tabulated below:

TABLE 1

| | Additive total, 25 parts | | | Viscosity (centipoises) | | | | |
|---|---|---|---|---|---|---|---|---|
| | Furfuryl Alcohol | Paraformaldehyde | Urea | Initial | 10 hours | 24 hours | 56 hours | 156 hours |
| A | 25 | 0 | 0 | 450 | 1,790 | 7,200 | 22,750 | 28,800 |
| B | 22.5 | 2.5 | 0 | 560 | 4,525 | 23,650 | 62,500 | 256,000 |
| C | 21.4 | 2.4 | 1.2 | 750 | 9,900 | 930,000 | 13,440,000 | 55,000,000 |
| D | 21.75 | 0 | 3.25 | 1,060 | 2,800 | 11,000 | 3,200,000 | 15,350,000 |

The results indicate that at the more dilute concentrations of polyester, the furfuryl alcohol copolymers are more effective than when furfuryl alcohol is used by itself as in Example I.

Thus, the invention discloses a novel system for thickening curable unsaturated polyester resin systems by the addition of one or more monomers which polymerize in the presence of the phosphinic acid groups in the polyester to thicken the resin without initiating the vinyl copolymerization of the resin. Thus, the resin is still flexible, easily handled, and may be cut to proper shape or size for subsequent molding and curing without waste of excess valuable resin.

What is claimed is:

1. A curable unsaturated polyester resin system which increases in viscosity after formation of the system and before the curing of the system has been initiated comprising:
  (a) 40 to 90% by weight of an unsaturated polyester formed by condensing in approximately equimolar porportions:
    (1) at least one dicarboxylic acid at least a portion of which contains alpha,beta-ethylenic unsaturation with
    (2) a dihydric alcohol of which 5 to 25 mole percent based on total moles of acids and alcohols is bis(hydroxymethyl) phosphinic acid;
  (b) 10 to 60% by weight of monomer of which
    (1) 10 to 25% by weight is furfuryl alcohol or a mixture of furfuryl alcohol and comonomer selected from the class consisting of urea, formaldehyde, or mixtures thereof, up to 15% by weight of said mixture of furfuryl alcohol and comonomer being comonomer,
    (2) the remainder of monomer being selected from the class consisting of styrene, alphamethyl styrene, chlorostyrene, vinyl toluene, and divinyl benzene.

2. Polyester resin system of claim 1 wherein the unsaturated polyester has an acid number below 100 and the ethylenically unsaturated copolymerizable dicarboxylic acid is selected from the class consisting of maleic anhydride, maleic acid and fumaric acid.

(References on following page)

References Cited

UNITED STATES PATENTS

| | | | |
|---|---|---|---|
| 2,911,389 | 11/1959 | Pernert | 260—75 |
| 3,450,669 | 6/1969 | Nolen | 260—45.9 |

FOREIGN PATENTS

| | | |
|---|---|---|
| 122,126 | 3/1967 | Czechoslovakia. |

OTHER REFERENCES

Dunlap: Kirk-Othmer Encycl. Chem. Technol., 2nd ed., 10, 237–51 (1966), p. 246 supplied.

WILLIAM H. SHORT, Primary Examiner
M. GOLDSTEIN, Asssistant Examiner

U.S. Cl. X.R.

117—124; 260—75, 867